United States Patent [19]

Kern

[11] Patent Number: 4,758,351

[45] Date of Patent: Jul. 19, 1988

[54] METHOD FOR SELECTIVE REMOVAL OF HEAVY METALS FROM LIQUIDS

[75] Inventor: Helmut Kern, Geisenheim-Johannisberg, Fed. Rep. of Germany

[73] Assignee: Erbsloh Geisenheim GmbH & Co., Geisenheim, Fed. Rep. of Germany

[21] Appl. No.: 940,960

[22] Filed: Dec. 12, 1986

[30] Foreign Application Priority Data

Dec. 21, 1985 [DE] Fed. Rep. of Germany ....... 3545578

[51] Int. Cl.$^4$ .............................................. B01D 15/00
[52] U.S. Cl. ..................................... 210/688; 426/271
[58] Field of Search ......................... 210/688; 426/271

[56] References Cited

U.S. PATENT DOCUMENTS

| 4,139,502 | 2/1979 | Halmann et al. | 210/673 |
| 4,293,693 | 10/1981 | Cohen et al. | 544/221 |
| 4,350,801 | 9/1982 | Grasshoff | 526/234 |

Primary Examiner—Ivars Cintins
Attorney, Agent, or Firm—Michael L. Dunn

[57] ABSTRACT

An agent for selective removal of heavy metals from liquids, especially from wines, fruit juices and alcoholic beverages, consists of a polymer with heavy metal ion binding groups which can be produced by oximating a free aldehyde group-containing polymer with the aid of hydroxylamine, or by polymerizing a polymerizable aldehyde oximated with hydroxylamine, followed by oxidation in each case.

17 Claims, No Drawings

METHOD FOR SELECTIVE REMOVAL OF HEAVY METALS FROM LIQUIDS

Liquids, especially beverages such as wine, fruit juices and alcoholic beverages, can contain heavy metals in different quantities. These can be objectionable from the toxicologic and hygienic viewpoint, or can cause clouding in the beverages, so that efforts have long been underway to reduce the heavy metal contents of such beverages, especially of wine.

The reasons for the accumulation of heavy metals differ and can, for example, originate from copper sulfate clarification or from the corrosion of metal parts that are in contact with the beverage.

Especially significant among these heavy metals are iron and copper; if these exceed a critical concentration (0.3 to 0.5 mg/l in the case of copper and 3 to 7 mg/l in the case of iron), depending on the redox potential and the composition of wine or other beverage, these can give rise to the separation of turbidities.

One known method for reducing the heavy metal content of wines is the so-called blue clarification with the aid of potassium hexacyanoferrate, which more or less selectively removes iron and copper from the beverage.

This method of clarification is problematic from the toxicologic viewpoint, since in the case of overclarification of the acid beverage, hydrogen cyanide is formed in small amounts and remains in the beverage. Additional problems of this protection type include the treatment of the sediment, since the precipitate to be removed partly remains colloidally dissolved and is poorly filterable. Finally, the separated solids cannot be conveyed to an ordinary landfill, but must ultimately be stored as special waste. All of this makes blue clarification problematic and unattractive.

A similar clarification method is that with Fessler's Compound, which is based on a similar principle. This Fessler's Compound is prepared from iron (II) sulfate and a superequivalent quantity of potassium hexacyanoferrate. The same problems arise in this clarification method as in the case of blue clarification. This complex compound is also unstable on storage.

One possibility for the precipitation of trivalent iron is provided by the treatment with Ca phytate (inositol tetracalcium phosphate). This treatment is only permissible for red wine. According to E. Vogt, Der Wein—Bereitung, Behandlung, Untersuchung—(Wine: Its Preparation, Treatment and Investigation), 5th Edition, Verlag Eugen Ulmer, Stuttgart 1968, copper and zinc as well as divalent iron are not precipitated.

According to H. Tanner: Calcium phytate clarification and subsequent clouding by liberated calcium, Schw. Ztschr. f. Obst- u. Weinbau, p. 391, 1966, a risk of subsequent turbidity exists, since the reaction with iron only takes place very slowly (often only after months).

Czechoslovak Pat. No. 163,307 describes the process for removing metal cations from wine with the aid of amidoxime starch. However, this compound has a limited binding ability for copper ions and thus only a limited efficacy.

Finally, Czechoslovak Pat. No. 147,431 describes a method for the clarification and stabilization of wine with the aid of sodium pectate. However, this is not selective for heavy metals, but also binds other ions, such as calcium and magnesium ions, which is highly undesirable.

The task on which the invention is based now consisted of obtaining new means for selective removal of heavy metals, especially iron and copper ions, from liquids, especially beverages, most especially wines, fruit juices and alcoholic beverages, which overcomes the above-mentioned problems of known methods, binds iron and copper equally to the most complete extent possible, produces no toxicologically objectionable products even in the case of overclarification, and acts selectively on heavy metal ions.

The agent in accordance with the invention, which consists of a polymer with heavy metal ion binding groups, is characterized in that the polymer can be manufactured by oximating a polymer containing free aldehyde groups with the aid of hydroxylamine or by polymerization of a polymerizable aldehyde oximated with hydroxylamine, and subsequently oxidizing. The first alternative is preferred.

In both alternatives the polymer can be a homopolymer or copolymer.

Examples of polymers containing free aldehyde groups are starch dialdehyde and cellulose dialdehyde, preferably polyacrolein. One example of a polymerizable aldehyde is acrolein.

Therefore when we are speaking of the fact that this agent consists of the polymers mentioned, naturally this does not mean that when the agent is added to the beverage to be clarified this polymer cannot be added in a mixture with or simultaneously with other materials, for example inert materials such as filter aids, or with other clarifying agents. Therefore the concept of the invention is also intended to include agents in which the polymer mentioned is present in a mixture with other substances.

Upon use for the clarification of beverages, the oximated and subsequently oxidized polymer is added in suitable quantity to the beverage, and following an appropriate treatment time, which must be sufficient to bind the heavy metal ions, especially iron and copper, it is removed, using normal cellaring methods. The separation can be performed by filtration, centrifugation or the like.

The polymer used in accordance with the invention is insoluble in the beverages considered. This can be demonstrated by the fact that upon evaporative concentration of a model solution, treated with the agent, wherein the model solution itself was made up of constituents that evaporate without leaving residues (ethanol/water/HCl to pH 3) no organic residues are left behind. The agent in accordance with the invention also has no effect on the taste of the beverage, and can furthermore be stored for a long time without changes.

The polyacrolein to be used for the oximation and subsequent oxidation can be produced by redox polymerization. Disacryl also forms a polyacrolein oxime with hydroxylamine, and is therefore alternatively usable.

Distilled and thus destabilized acrolein polymerizes by itself to disacryl or polyacrolein over the course of several weeks. However, the polyacroleins do not necessarily have the same structure. Polyacrolein polymerized under catalysis with Fe(II) and peroxydisulfate is especially suitable.

For oximation, the polyacrolein is mixed with hydroxylamine or one of its salts, after which the polyacrolein oxime formed is subjected to oxidation.

Alternatively, acrolein is first oximated with hydroxylamine, after which the acrolein oxime, like acrolein itself, is polymerized. The oximated polyacrolein thus obtained is then oxidized.

Although various oxidizing agents are suitable, for example iodine, not all oxidized products are equally effective. Therefore a polymer is preferably used which was produced by oxidation of the polyacrolein oxime with hydrogen peroxide in alkaline medium. During oxidation it is advantageous to operate at relatively low temperatures with a maximum of 70° C.

The structure of the polymer used in accordance with the invention has not been ultimately resolved, but it is conceivable that after oximation and oxidation, the aldehyde groups of the polyacrolein have been converted into groups of the structure

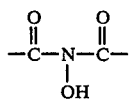

which are arranged arbitrarily distributed over the polymer molecule or link two polymer molecules together.

As was mentioned, the agent in accordance with the invention is insoluble in wine and other liquids under consideration here, such as beverages, so that overdosage is not possible and no taste or other impairment of the beverage takes place. After binding of the heavy metal ions, the polymer can be easily removed, for example by filtration, and can be deposited in landfills in the normal way, so that the final storage as special waste is unnecessary.

The manufacture of the polymer can take place as follows, for example:

Commercial acrolein stabilized with 0.2% hydroquinone is distilled and then polymerized with heating and addition of diammonium-iron (II) sulfate and potassium peroxydisulfate. The polyacrolein obtained is filtered by suction and washed free from iron (II) and $SO_4$ ions with 0.1M HCl and water.

Next the oximation and subsequent oxidation follow, both of which can take place in the same reaction vessel. The polyacrolein is suspended in water, after which hydroxylammonium chloride is added under oximation. Then the solution is made alkaline with sodium hydroxide, and hydrogen peroxide is added, whereupon nitrous gases form. The polyacrolein oxime formed in this process is filtered by suction, washed with water, and purified from remaining impurities. This can be done by treatment with tartaric acid or iodine solution, followed by washing with water (or with $Na_2S_2O_3$ solution when iodine solution has been used) and methanol, then by drying at 70° C.

The examples which follow will serve for further explanation of the invention.

EXAMPLE 1

Preparation of the Oxidized Polyacrolein Oxime (a) Polyacrolein

Acrolein was distilled immediately prior to use (b.p.=56° C.). Some copper turnings were placed in the reservoir of the distillation apparatus to prevent spontaneous polymerization.

13.5 g potassium peroxydisulfate ($K_2S_2O_8$) were dissolved in 400 ml distilled water. Together with 97 ml freshly distilled acrolein, this solution was placed in a 1 l three-necked flask.

Within half an hour 500 ml of a 0.1M diammonium iron (II) sulfate solution $(NH_4)_2Fe(SO_4)_2.6H_2O$, MW 381.4, was dropped in. The temperature was not allowed to exceed 30° C. Any iron hydroxide that might have precipitated during preparation of the iron salt solution was first filtered off.

After the end of the iron salt addition, agitation was continued for half an hour, then the mixture was filtered by suction and washed with an abundant quantity of distilled water that had been slightly acidified with dilute hydrochloric acid (ca. 2 l wash solution. Washing was continued until the wash solution contained no further iron or sulfate.

(b) Polyacrolein oxime

About 15 g polyacrolein were suspended in water in a glass beaker. Then 30 g hydroxylamine hydrochloride were added under agitation. After a reaction time of about 1 hr a distinct yellow color was seen. The solution was then adjusted to pH 11 to 11.5 by adding approximately 20% NaOH.

(c) Oxidized polyacrolein oxime

30% perhydrol was dropped in very slowly into the suspension obtained under (b), in a molar ratio equal to that of the acrolein used. In this process the temperature was not to exceed 40° C. The reaction was complete after a maximum of 15 hr.

A pH of approximately 3 was established with 10% HCl, dropped in slowly. The polymer was filtered off by suction after about 30 min. To remove water-soluble fractions, it was washed thoroughly with water and iodine solution or tartaric acid solution. It was subsequently washed with methanol and dried at a maximum of 60° C.

EXAMPLE 2

Selective Removal of Copper and Iron from Wine

Using the method described in Example 1, various oxidized polyacrolein oximes were produced using different molar ratios and oxidation temperatures. The molar ratios, oxidation temperatures and yields of the polymers produced in accordance with the invention and then investigated are presented in Table 1 below.

In the experiments which follow, the following ion exchange resins were used for comparison purposes:

TABLE 1

| Agent no. (according to the invention) | Molar ratio | | | Temperature on oxidation | Yield (%) |
|---|---|---|---|---|---|
| | acrolein | NONH$_2$HCl | H$_2$O$_2$ | | |
| 1 | 1 | 1 | 1.1 | 65° C. | 48 |
| 2 | 1 | 1 | 0.75 | 40° C. | 53 |
| 3 | 1 | 1 | 0.75 | 65° C. | 55 |
| 4 | 1 | 1 | 0.5 | 30° C. | 47 |
| 5 | 1 | 1 | 0.75 | 40° C. | 45 |

(a) Chelite N (Serva): The reactive exchange groups are amidoxime groups which enter into extremely strong bonds with heavy metals.

(b) Chelite S (Serva): The reactive exchange groups are sulfhydryl groups (—S—H), which have particular affinity for mercury but also react with other heavy metals.

(c) An exchange resin consisting of a styrene framework with sulfhydryl groups.

(d) Phosphorylated cellulose.

A wine with the contents of iron, copper and sodium given in Tables IIa and IIb and with the pH value likewise indicated was treated with 1 g/l or 2 g/l of various agents. Agitation was continued overnight, and then suction was performed with a membrane filter. The residual contents of iron, copper and sodium were determined. The results are presented in the following Tables IIa and IIb.

Agents 2 and 5 gave the best results, which shows that oxidation at low temperatures is most advantageous.

The comparison polymers have considerably poorer results. Chelite N led to an inadequate removal of copper. The comparison preparations to some extent led to accumulation of sodium, which is extremely undesirable.

TABLE IIa

| Agent no. (invention) | ppm Fe | ppm Cu | ppm Na | pH |
|---|---|---|---|---|
| 0-probe | 9.6 | 4.8 | 16.4 | 3.5 |
| 1 (1 g/l) | 7.6 | 0.7 | 14.5 | 3.5 |
| 1 (2 g/l) | 4.4 | 0.3 | 14.0 | 3.5 |
| 2 (1 g/l) | 1.3 | 0.9 | 14.0 | 3.5 |
| 2 (2 g/l) | <0.1 | 0.3 | 14.2 | 3.5 |
| 3 (1 g/l) | 2.7 | 1.4 | 14.7 | 3.5 |
| 3 (2 g/l) | 1.0 | 0.6 | 14.2 | 3.5 |
| 4 (1 g/l) | 1.6 | 1.3 | 13.5 | 3.5 |
| 4 (2 g/l) | 0.2 | 0.5 | 13.8 | 3.5 |
| 5 (1 g/l) | 1.5 | 0.9 | 13.6 | 3.5 |
| 5 (2 g/l) | 0.1 | 0.3 | 13.6 | 3.5 |
| Comparison | | | | |
| Chelite S (b) (1 g/l) | 9.6 | 3.8 | 15.4 | 3.5 |
| Chelite S (b) (2 g/l) | 9.6 | 3.0 | 17.1 | 3.5 |
| SH—Styrene (c) (1 g/l) | 8.4 | 3.1 | 26.7 | 3.5 |
| SH—Styrene (c) (2 g/l) | 7.4 | 2.0 | 41.1 | 3.5 |

The wines treated with Chelite N also showed lightening and taste impairment. The agents in accordance with the invention did not cause any taste impairment of the wine.

The above comparison experiments show the superior efficacy of the agents in accordance with the invention in the selective removal of copper and iron from wine and other beverages.

TABLE IIb

| | ppm Fe | ppm Cu | ppm Na | pH |
|---|---|---|---|---|
| 0-Sample | 9.4 | 4.0 | 12.1 | 3.4 |
| Chelite N* (a) (0.3–0.8 mm) (1 g/l) | 5.5 | 3.6 | 13.8 | 3.4 |
| Chelite N* (0.3–0.8 mm) (2 g/l) | 3.0 | 3.1 | 14.0 | 3.4 |
| Chelite N (0.3–0.8 mm) (2 g/l) | 2.6 | 3.0 | 25.4 | 3.4 |
| Chelite N* (0.005–0.1 mm) (1 g/l) | 0.5 | 2.8 | 14.3 | 3.4 |
| Chelite N* (0.05–0.1 mm) (2 g/l) | 0.2 | 2.0 | 16.3 | 3.4 |
| Chelite N (0.05–0.1 mm) (2 g/l) | 0.2 | 2.0 | 45.0 | 3.4 |

TABLE IIb-continued

| | ppm Fe | ppm Cu | ppm Na | pH |
|---|---|---|---|---|
| phos. cellulose (d) (2 g/l) | 2.4 | 4.0 | 14.8 | 3.4 |

*To prevent a pH change the resin was pretreated with 2% $K_2CO_3$ solution.

I claim:

1. A method for selective removal of heavy metals, which will react with a polymer comprising oximated and oxidized aldehyde groups, from a beverage which comprises treating the beverage with a polymer comprising oximated and oxidized aldehyde groups.

2. The method of claim 1 wherein the polymer comprises a polymerized monomer having oximated aldehyde groups which polymer is subsequently oxidized.

3. The method of claim 2 wherein the aldehyde groups are oximated with hydroxylamine.

4. The method of claim 2 wherein the monomer comprises oximated and oxidized acrolein.

5. The method of claim 4 wherein the oximated aldehyde groups are oxidized with hydrogen peroxide in alkaline medium.

6. The method of claim 1 wherein the polymer comprises aldehyde groups which polymer is subsequently oximated and oxidized.

7. The method of claim 6 wherein the polymer comprises oximated and oxidized polyacrolein.

8. The method of claim 7 wherein the oximated aldehyde groups are oxidized with hydrogen peroxide in alkaline medium.

9. The method of claim 8 wherein the aldehyde groups are oxidized at a maximum temperature of 50° C.

10. A method of claim 8 wherein the aldehyde groups are oxidized at a maximum temperature of 40° C.

11. The method of claim 7 wherein the polymer comprises a polyacrolein obtained by polymerization of acrolein catalyzed by Fe(II) and peroxodisulfate.

12. The method of claim 6 wherein the aldehyde groups are oximated with hydroxylamine.

13. The method of claim 1 wherein the aldehyde groups are oximated with hydroxylamine.

14. The method of claim 13 wherein the oximated aldehyde groups are oxidized with hydrogen peroxide in alkaline medium.

15. The method of claim 1 wherein the oximated aldehyde groups are oxidized with hydrogen peroxide in alkaline medium.

16. The method of claim 15 wherein the aldehyde groups are oxidized at a maximum temperature of 70° C.

17. A method for selective removal of heavy metals which will react with a polymer comprising oximated and oxidized aldehyde groups, from a liquid which comprises treating the liquid with a polymer comprising oximated and oxidized aldehyde groups.

* * * * *